UNITED STATES PATENT OFFICE.

JOHN C. PENNINGTON, OF PATERSON, NEW JERSEY.

IMPROVEMENT IN THE MANUFACTURE OF NITRATE OF POTASH FROM NITRATE OF SODA.

Specification forming part of Letters Patent No. 35,946, dated July 22, 1862.

*To all whom it may concern:*

Be it known that I, JOHN C. PENNINGTON, of Paterson, in the county of Passaic and State of New Jersey, have invented a new and Improved Process for the Manufacture of Saltpeter and Bicarbonate of Soda: and I do hereby declare that the following is a full, clear, and exact description of the same.

The object of this invention is to produce or prepare saltpeter and bicarbonate of soda from common pearlash or carbonate of potash and Chili saltpeter or nitrate of soda.

My process is based on the insolubility of bicarbonate of soda as compared with the protocarbonate, and it is carried out in the following manner: The common pearlash or carbonate of potash of commerce is submitted to the action of carbonic acid derived from any of the well-known sources, thereby changing it to bicarbonate of potash. This object is effected, for instance, by placing the pearlash on shelves in a chamber and leading the products of combustion of coke over it, having first passed the gases over water to charge them with moisture. It usually takes about two weeks to thoroughly bicarbonate the potash. The crude bicarbonate of potash is now analyzed and mixed with a solution of nitrate of soda (Chili saltpeter) of such strength that after decomposition with the potash there will remain a nearly-saturated solution of nitrate of potash. The proportion between the bicarbonate of potash and nitrate of soda is taken according to their chemical equivalents when nearly one-half of the soda present is precipitated in the state of bicarbonate of soda. The solution is now transferred to a kettle and thoroughly boiled to drive out one equivalent of carbonic acid from the remaining soda, whereby it (the soda) becomes much more soluble, and more than one-half of the nitrate of potash present can now be crystallized almost entirely free from soda before sufficient soda is contained in the solution to crystallize with the nitrate of potash. The remaining solution, which contains nitrate of potash and protocarbonate of soda, is now either evaporated to the crystallizing-point and allowed to cool or evaporated down to dry salt and the residue placed in the bicarbonating-chamber. When the soda is again saturated with carbonic acid the nitrate of potash is leached out with as little warm water as will dissolve all the nitrate of potash. The residue is dried and is ready for sale as bicarbonate of soda, and the solution of nitrate of potash is treated as before.

Instead of evaporating the solution after separating one-half of each salt, it might be charged with carbonic acid in an agitating apparatus, when the bicarbonate of soda will precipitate as before.

Having thus fully described my invention, what I claim as new, and desire to secure by Letters Patent, is—

The within-described process of manufacturing saltpeter and bicarbonate of soda by treating nitrate of soda with bicarbonate of potash and alternately crystallizing from the solution bicarbonate of soda and nitrate of potash, substantially in the manner described.

JOHN C. PENNINGTON.

Witnesses:
 JAMES LAIRD,
 R. GAWLEY.